US011953787B2

(12) United States Patent
Abdulhalim et al.

(10) Patent No.: US 11,953,787 B2
(45) Date of Patent: Apr. 9, 2024

(54) OPTICAL DEVICE CAPABLE OF RESPONDING TO A WRITING LONG-WAVE RADIATION

(71) Applicants: Ibrahim Abdulhalim, Wahat Alsalam-Neveh Shalom (IL); Hisham Abdulhalim, Haifa (IL)

(72) Inventors: Ibrahim Abdulhalim, Wahat Alsalam-Neveh Shalom (IL); Hisham Abdulhalim, Haifa (IL)

( * ) Notice: Subject to any disclaimer, the term of this patent is extended or adjusted under 35 U.S.C. 154(b) by 455 days.

(21) Appl. No.: 17/282,852

(22) PCT Filed: Oct. 6, 2019

(86) PCT No.: PCT/IL2019/051087
§ 371 (c)(1),
(2) Date: Apr. 5, 2021

(87) PCT Pub. No.: WO2020/070749
PCT Pub. Date: Apr. 9, 2020

(65) Prior Publication Data
US 2021/0349354 A1   Nov. 11, 2021

Related U.S. Application Data

(60) Provisional application No. 62/741,744, filed on Oct. 5, 2018.

(51) Int. Cl.
*G02F 1/13357*   (2006.01)
*G02B 5/20*   (2006.01)
(Continued)

(52) U.S. Cl.
CPC ....... *G02F 1/133617* (2013.01); *G02B 5/208* (2013.01); *G02B 27/30* (2013.01);
(Continued)

(58) Field of Classification Search
None
See application file for complete search history.

(56) References Cited

U.S. PATENT DOCUMENTS

| 7,595,927 B2 * | 9/2009 | Ishii | H04N 9/312 |
| | | | 359/290 |
| 2002/0149584 A1 * | 10/2002 | Simpson | G02F 1/011 |
| | | | 345/428 |

(Continued)

FOREIGN PATENT DOCUMENTS

| WO | 2005022900 A2 | 3/2005 |
| WO | 2017033184 A1 | 3/2017 |

(Continued)

OTHER PUBLICATIONS

Solodar et al; "Infrared to visible image up-conversion using optically addressed spatial light modulator utilizing liquid crystal and InGaAs photodiodes" Applied Physics Letters vol. 108 No. 2 pp. 0211103-1-5. (2016).

(Continued)

*Primary Examiner* — Stefan Gadomski
(74) *Attorney, Agent, or Firm* — The Roy Gross Law Firm, LLC; Roy Gross

(57) ABSTRACT

The present invention relates to an optical imaging device capable of responding to a writing long-wave radiation (w) emitted by any object or scene. Said device is configured to operate in reflection mode or in transmission mode and comprises a reading light unit (2), writing light unit (4), resonant optically-addressed spatial light modulator (ROASLM) (3) with an optically-responsive resonant structure (ORRS) (100) and a detector (40), wherein said (ORRS) (100) comprises: a photosensitive layer (101) deposited on a transparent substrate for absorbing the writing radiation (w) in a form of the long-wave image of the object or scene (1) and transforming said image into the stimulating signal (Continued)

across the ORRS (100), optical layers (102) for inducing resonance effect to the stimulating signal formed in the ORRS (100), optional alignment layers (103) for aligning liquid crystal molecules, and the conversion layer (104) for converting the resonant long-wave image of the object or scene (1) into a visible-range image.

21 Claims, 6 Drawing Sheets

(51) Int. Cl.

| | | |
|---|---|---|
| *G02B 27/30* | (2006.01) | |
| *G02F 1/1335* | (2006.01) | |
| *G02F 1/1337* | (2006.01) | |
| *G02F 1/1343* | (2006.01) | |
| *G02F 1/137* | (2006.01) | |
| *H04N 5/33* | (2023.01) | |
| *H04N 23/10* | (2023.01) | |

(52) U.S. Cl.
CPC ...... *G02F 1/133502* (2013.01); *G02F 1/1337* (2013.01); *G02F 1/13439* (2013.01); *G02F 1/137* (2013.01); *H04N 5/33* (2013.01); *H04N 23/10* (2023.01); *G02F 2203/13* (2013.01)

(56) References Cited

U.S. PATENT DOCUMENTS

2016/0070125 A1    3/2016  Reich et al.
2019/0376893 A1*  12/2019  Takahashi .......... G02B 21/0012

FOREIGN PATENT DOCUMENTS

WO    WO-2017070178 A1 *  4/2017  ............. A61B 3/102
WO       2020070749 A1     4/2020

OTHER PUBLICATIONS

Abdulhalim "Optimized guided mode resonant structure as thermooptic sensor and liquid crystal tunable filter" Chinese Optics Letters vol. 7 No. 8 pp. 667-670. (2009).
Sivan Isaacs et al.; "Investigation of Liquid Crystal Fabry Perot Tunable Filters: Design, Fabrication and Polarization Independence", Applied Optics 53, H91-H101.(2014).
Shahar Mor et al; "Planar polar liquid crystalline alignment in nanostructured porous silicon one dimensional photonic crystals", Applied Physics Letters. 97, 113106, (2010).
PCT Search Report for International Application No. PCT/IL2019/051087; dated Dec. 19, 2019; 4 pp.
PCT Written Opinion for International Application No. PCT/IL2019/051087; dated Dec. 19, 2019; 9 pp.

* cited by examiner

OPTICAL DEVICE CAPABLE OF RESPONDING TO A WRITING LONG-WAVE RADIATION

This application is a National Phase of PCT Patent Application No. PCT/IL2019/051087 having International filing date of Oct. 6, 2019, which claims the benefit of priority of U.S. Provisional Patent Application No. 62/741,744, filed Oct. 5, 2018, the contents of which are all incorporated herein by reference in their entirety.

TECHNICAL FIELD

The present application relates to the technical field of optical processing with photonic instruments based on liquid crystals, magnetooptics, electrooptics or thermooptics. The present invention also relates to the field of object or scene imaging in the long wavelengths range such as infrared, thermal or THz radiation with spectroscopic sensors, molecular optics and devices for light manipulation and imaging. In particular, the present invention relates to an optical device suitable for imaging of an object or scene emitting a writing long-wave radiation.

BACKGROUND

Parallel optical processing of information is of high importance in many fields from imaging, optical computing, pattern recognition and more. Good examples of such processors are the 1D or 2D array of detectors which detect the spatial contents of information in parallel. Parallel detectors are arrays of detectors either one dimensional (1D array) or two dimensional (2D array) used to detect radiation intensity distribution either in 1D or 2D. A CCD or CMOS cameras are 2D arrays of pixels used for imaging and intensity distribution determination usually made of Si based technology and therefore their sensitivity is in the visible range up until around 1000 nm.

In spectroscopic applications, 2D arrays are used sometimes as 1D arrays by combining all the pixels in one row or one column together. When the radiation to be detected is in the long wave region such as infrared, the materials used are different from Si based materials and therefore the manufacturability, cost and response limit the number of pixels thus affecting the resolution. It is the purpose of the present invention to overcome this problem by combining a photosensitive layer with an electrooptic, magnetooptic, electomechanical, or thermooptic layer such as liquid crystal layer in what is known as optically addressed spatial light modulator (OASLM) configuration.

The OASLM is considered as a key component in optical computing, correlators, and projection displays. However, its potential use as a long wave parallel detector when combined with a visible light camera (CMOS or CCD based on Si technology) has never been disclosed before, particularly the use of the liquid crystal layer in conjunction with a resonant structure to increase the sensitivity as a parallel detector for the long wave radiation.

One of the promising photonic structures for light manipulation are resonant structures such as the Fabry-Perot or the guided mode resonance structure shown in FIG. 1. The guided-mode-resonance (GMR) structure is usually based on a resonant excitation of a guided mode using thin and weak grating on top of a waveguide layer. The filter has a planar structure as schematically shown in FIG. 1 which includes a liquid crystal layer (11), gratings (12) of sub-wavelength period (400 nm or less for operation with visible light, or less than 900 nm for operation in the optical telecom IR window of the wavelength range 1500 nm-1600 nm), the waveguide layer (13), a buffer layer (14), a substrate (15), transparent conducting electrodes (TCE) (16) made, for example, from indium tin oxide (ITO) layers, polymer alignment layers (17), and some additional dielectric layers to minimise unwanted reflections (ARC) (18). In FIG. 1, "R" is reflection, "T" is transmission, and "I" is an electric current.

For a sub-wavelength grating, the grating period is shorter than the incident wavelength, only the zero-order forward and backward diffracted waves propagate, while all higher order waves are cut off. The resonance is monitored in reflection or in transmission using polarized light at a fixed incidence angle (normal incidence is the easiest) as a function of the wavelength (see FIG. 1). The spectrum consists of a peak in reflection or a dip in transmission. The resonance location is determined by: $\lambda_{res} = n_{eff} \Lambda$, where $\Lambda$ is the period of the gratings and $n_{eff}$ is the effective refractive index of the guided mode. Since the grating is very thin (less than 100 nm height) a large part of the evanescent field is in the LC layer, thus the mode effective index $n_{eff}$ is determined in large part by the LC refractive index. Tuning the LC refractive index will then cause the resonance to shift.

A typical variation of the LC refractive index is 0.15, giving a tuning range of 150 nm for $\Lambda$=1000 nm. One can also use a thick grating layer with high refractive index contrast instead of using a thin grating and a waveguide layer. Many other periodic structures give resonance either as peak or a dip in reflection or transmission. Other examples of resonant structures are possible, for example based on noble metal structures such as metallic gratings, periodic array such as nanocubes array on top of gold film, grating on gold and many more in which the excitation of an extended plasmon is possible resulting in a dip in reflection or even sometimes a peak in transmission such as with the case of enhanced optical transmission through periodic nano-apertures.

It is therefore one of the objectives of the present invention to practically use resonant optical structures, such as the guided-mode-resonance (GMR), or plasmonic structures combined with electrooptic, magnetooptic or thermooptic layer that responds resonantly to external stimulus, such as light, electric or magnetic field or temperature. Such structures can then be used as tuneable filters, colour manipulators, image colour converters and sensors. Another objective of the present invention is to use a liquid crystal as the thermooptic, electrooptic or magnetooptic responsive layer for converting infrared or thermal image to visible range image that can be seen with a standard Si based camera or directly with the human eye.

Digital cameras have revolutionized the world in many aspects both for photography as well as scientific and technological applications. However, there are still several limitations of existing cameras: (1) they need to be pixelated, (2) complicated circuitry is needed to obtain the signals and (3) cost-effective high-resolution cameras are limited to the visible range while infrared, thermal detectors and in general long wave detectors are much more expensive and usually with less resolution. The present invention overcomes these limitations, particularly in the case of long wave cameras.

In general, digital cameras for detection of the long wavelength (LW) radiation, such as infrared (IR), terahertz (THz) and microwaves (MW) are highly required due to the importance of these spectral ranges in many applications, such as medical or remote sensing and detection of chemicals. For the sake of consistency, the term "LW" is used hereinbelow for any radiation with wavelengths that cannot be detected by silicon (Si)-based cameras or detectors which are sensitive below wavelength of about 1000 nm. Shortwave infrared (SWIR) radiation is characterized by wavelengths in the range of approximately 1000-1700 nm and detected using InGaAs- or Ge-based detectors. Today there is a great interest in such cameras, particularly in thermal cameras.

Thermal radiation wavelengths fall typically in the longwave infrared (LWIR) radiation range of 8-14 μm, with maximum wavelength following the Wien's displacement law of black body radiation: $\lambda_{max}(\mu m)=b/T$, where b is a displacement constant of proportionality in this law, and it is equal to 2897.77 μm×K. As a reference, $\lambda_{max}$=9.6 μm at room temperature T=300° K.

Infrared (IR) or thermal imaging market, used to be mainly in defence, is now shifting to civilian sectors with the rise of new commercial and high-volume markets such as automotive, surveillance, thermography, and IR imaging in smartphones. The market size in 2018 was around one million units for civil market and only 0.1 million units for defence market. When entered the smart phone application, the market size is expected to rise to 9.8 million units in year 2021. It is believed that thermal imaging is going to play a major role in turning self-driving vehicles into consumer products. This trend created a cost-driven market in favour of uncooled infrared imaging systems.

Unlike the cooled counterparts, which operate based on photo-generation and collection of electrons and holes, uncooled IR detectors sense the temperature change due to the absorption of the IR radiation. The cooled detectors offer higher performance (higher resolution, higher signal-to-noise ratio, faster response) at a high cost due to the need for cryogenic cooling. On the other hand, uncooled detectors offer cost effective solutions targeting the competitive low-end high-volume user market. Among uncooled detectors such as thermopiles, pyroelectric detectors and microbolometers, the latter are probably the most popular for infrared imaging purposes offering very high resolution.

Microbolometers are made of various temperature-sensitive resistance materials, such as vanadium oxide for forming an electronic image. Their resolution at the ambient temperature is in the order of 20 mK. However, the complexity of the readout integrated circuit and the need for the thermal leg structures to be electrically conductive with a high thermal resistance results in difficulty in scaling the device to smaller formats. Other newly emerging infrared detectors involve quantum dots technology and combination of plasmonic materials with photosensitive materials to improve the quantum efficiency. Similar and more complex limitations also exist on the detection of longer wavelength radiation such as in the THz range.

SUMMARY

The present application describes embodiments of an optical device suitable for imaging of an object or scene (1), said object or scene (1) emitting a writing long-wave radiation (w), said device configured to operate in reflection mode or in transmission mode and comprises:

A. A reading light unit (2) comprising:
   (a) A light source (10) configured to generate a reading light beam and to direct said reading light beam onto a collimator (20);
   (b) The collimator (20) in optical communication with said light source (10), said collimator is an optical assembly of curved mirrors or lens designed to collimate said reading light beam, thus forming a collimated reading light beam (r), and to direct said collimated reading light beam (r) onto a resonant optically-addressed spatial light modulator (ROASLM) (3);

B. A writing light unit (4) in optical communication with the ROASLM (3) and comprising an optical assembly (50) designed to receive the writing radiation (w) from the object or scene (1) and to project said writing radiation (w) onto a photosensitive layer (101) of the ROASLM (3), thereby writing an image of the object or scene (1) on said photosensitive layer (101);

C. The resonant optically-addressed spatial light modulator (ROASLM) (3) in optical communication with the reading light unit (2) and with the writing light unit (4), said ROASLM (3) is configured to receive the polarised collimated reading light beam (p-r) from the reading light unit (2) and the writing radiation (w) from the writing light unit (4), and to modulate said reading light beam (p-r) with said writing radiation (w), thus converting long-wave images of said object (1) into visible-range images or finding colour changes or spectral content of said writing radiation (w), said ROASLM (3) comprises:
   a) an optically-responsive resonant structure (ORRS) (100) designed to receive the writing radiation (w) from the writing light unit (4) onto the photosensitive layer (101) of said ORRS (100), thereby writing an image of the object (1) on said photosensitive layer (101), to transform light distribution created by said image into a stimulating signal suitable for modulating the reading light beam (p-r), and to direct a thereby obtained spatially intensity-modulated reading light beam (m) to a detector (40), thus creating resonance-type variations of the received spatially intensity-modulated reading light beam (m) upon the change caused by the stimulated signal;
   b) a substrate (60) comprising an inner layer of a transparent conducting electrode (TCE) for applying voltage to the ORRS (100) and an outer dielectric anti-reflection coating (ARC) layer for minimising unwanted reflections; and
   c) a voltage source (105) designed to provide a voltage waveform to the substrate (60) and to a conversion layer (104) of the ORRS (100) for optimising the voltage division between the photosensitive layer (101) and the conversion layer (104) upon receiving the writing radiation (w), thus maximising the contrast of the spatially intensity-modulated reading light beam (m);

D. A detector (40) in optical communication with the ROASLM (3), said detector (40) is suitable for observing, detecting, reading and/or performing acquisition of the spatially intensity-modulated reading light beam (m) received from the ROASLM (3) to create visible-range images or detect colour changes or spectral content of the writing radiation (w) of the object or scene (1) emitting said writing radiation (w), and optionally to transmit said visible-range images or said spectral content of the writing radiation (w) to an external memory or user's interface; and E1. Provided that said device is configured to operate in reflection mode, the device further comprises a polarising device (30) installed between and in optical communication with the reading light unit (2), the ROASLM (3) and the detector (40), said polarising device (30) is either:
   (i) a polarising beam splitter configured to receive the incident collimated reading light beam (r) from the collimator (20) of the reading light unit (2), to split said collimated reading light beam (r) into two separate, linearly polarised, collimated beams either reflected (s-r) or transmitted (p-r) with orthogonal polarisation, and to direct the polarised collimated reading light beam (p-r) to the ROASLM (3), thereby converting phase retardation changes of said collimated reading light beam (p-r) reflected from the ROASLM (3) into intensity variations expressed in the spatially intensity-modulated reading light beam (m); or (ii) a polariser configured to receive the incident collimated reading light beam (r) from the collimator (20) of the reading light unit (2), to generate the polarised collimated reading light beam (p-r), and to direct said polarised collimated reading light beam (p-r) to the ROASLM (3) through an analyser configured to convert the retardation or polarisation modulation of said polarised collimated reading light beam (p-r) into the spatially intensity-modulated reading light beam (m); or (iii) a polariser designed to receive the incident collimated reading light beam (r) from the collimator (20) of the reading light unit (2), to generate the polarised collimated reading light beam (p-r), and to direct said polarised collimated reading light beam (p-r) to the ROASLM (3); or E2. Provided that said device is configured to operate in transmission mode, the device further comprises a dichroic mirror (70) installed between and in optical communication with the reading light unit (2), the ROASLM (3) and the writing light unit (4), said dichroic mirror (70) is configured to receive the incident collimated reading light beam (r) from the collimator (20) of the reading light unit (2), to reflect said reading light beam (r) and direct it to the ROASLM (3), and to transmit the writing radiation (w) emitted by the object or scene (1) to the ROASLM (3); characterised in that said ORRS (100) comprises:

(a) The photosensitive layer (101) in optical communication with the substrate (60), said photosensitive layer (101) is deposited on a transparent substrate and is suitable for absorbing the writing radiation (w) in a form of the long-wave image of the object or scene (1) and transforming said image into the stimulating signal across the ORRS (100);

(b) Optical layers (102) adjacent to the photosensitive layer (101) and suitable for inducing resonance effect to the stimulating signal formed in the ORRS (100);

(c) Optional alignment layers (103) adjacent to the optical layers (102) and suitable for aligning liquid crystal molecules; and (d) The conversion layer (104) adjacent to the optical layers (102) or to the alignment layers (103) and suitable for converting the resonant long-wave image of the object or scene (1) into a visible-range image.

In some embodiments, the photosensitive layer (101) of the optical device of the present invention comprises at least one pixel of a bolometric layer, a microbolometric layer array, a pyrometric layer, a photovoltaic layer sensitive to the writing radiation (w), a photodiode structure, a phototransistor layer, a back-to-back photodiode structure, a liquid crystal layer absorbing in the infrared range, a terahertz (THz) absorptive layer, an infrared absorptive layer, an absorptive layer under total internal reflection conditions, in which broadband lossy modes are excited, or a black body-type layer that converts the infrared radiation into heat. The photosensitive layer (101) may be pixelated, thus being suitable for minimising lateral diffusion effects of generated photocarriers or heat flux.

In other embodiments, the conversion layer (104) of the optical device of the present invention is an electrooptic, magnetooptic, or thermooptic layer. In a specific embodiment, said conversion layer (104) is a liquid crystal layer. Liquid crystals of said liquid crystal may be selected from nematic liquid crystals spatially arranged in a parallel, antiparallel, twisted, super-twisted, in-plane, hybrid or vertically aligned geometrical configuration, ferroelectric liquid crystals in surface stabilised geometry, vertically helical, tilted helical or deformable helix form, anti-ferroelectric liquid crystals, liquid crystal composites composed of a mixture of liquid crystals with ferromagnetic or ferroelectric nanoparticles, chiral liquid crystals, cholesteric liquid crystals, tilted or conical cholesteric liquid crystals, blue-phase liquid crystals, smectic liquid crystals, polymeric liquid crystals, liquid crystal composites with nano- and microparticles, and electroclinic liquid crystals.

In a specific embodiment, the ORRS (100) of the optical device of the present invention is selected from:

(a) a resonant grating structure with the conversion layer (104) being a liquid crystal layer;

(b) a guided-mode resonant grating structure with the conversion layer (104) being a liquid crystal layer;

(c) a guided-mode resonant structure with the conversion layer (104) being a helical liquid crystal with the helix axis laying in the plane of the substrates (60);

(d) a guided-mode resonant structure with the conversion layer (104) being a helical liquid crystal with the helix axis titled from the plane of the substrates (60);

(e) a multi-layered structure made of porous silicon layers;

(f) a porous structure infiltrated with the conversion layer (104), wherein said conversion layer (104) is a liquid crystal layer;

(g) a photonic crystal structure integrated with the conversion layer (104), wherein said conversion layer (104) is a liquid crystal layer;

(h) a periodic liquid crystal structure configured to exhibit selective reflection peaks;

(i) a multi-layered structure, further comprising at least one of the layers selected from an absorptive layer, a coupling layer and a waveguide layer configured to excite a broadband lossy mode or a Fano resonance;

(j) a cavity structure, such as a Fabry-Perot etalon, filled with the conversion layer (104), wherein said conversion layer (104) is a liquid crystal layer exhibiting at least one peak in transmission in the visible range;

(k) a cavity structure, such as a Fabry-Perot etalon, filled with the conversion layer (104), wherein said conversion layer (104) is a liquid crystal layer exhibiting at least one dip in reflection in the visible range;

(l) a plasmonic structure exhibiting at least one dip in reflection; and (m) a plasmonic structure exhibiting at least one peak in transmission.

In another specific embodiment, the light source (10) is selected from a laser, a light-emitting diode (LED) or a laser diode, a wide-spectrum halogen lamp, an arc-lamp and a mercury-vapour lamp.

In a particular embodiment, the detector (40) is an assembly of lenses and image sensors. In a specific embodiment, the detector (40) is selected from a charge-coupled device (CCD) imager, an electron-multiplying charge-coupled device (EMCCD) imager, an avalanche photodiode (APD), a complementary metal-oxide-semiconductor (CMOS), and a scientific-complementary metal-oxide-semiconductor (sCMOS) imager. In particular, the CMOS imager may be a CMOS imager of a smartphone camera, a stand-alone camera, or a camera of any mobile device or gadget, and said detector (40) optionally having a focusing apparatus and a computer link. In a further embodiment, the detector (40) is selected from a monochrome detector designed to read intensity changes in the optical spectrum of the of the spatially intensity-modulated reading light beam (m), a colour detector designed to read colour changes of the spatially intensity-modulated reading light beam (m), a spectral camera designed to read wavelength shifts of the spatially intensity-modulated reading light beam (m), a spectrometer, a colour mask and a tuneable filter. The detector (40) may also be an eye of a human.

In another embodiment, the detector (40) is designed to generate raw data from a spectral content of the long-wave writing radiation emitted by the object or scene (1) as a video or as a series of static images, to process said raw data to provide information on the object or scene (1) and to output said information to an external memory or user's interface. In a specific embodiment, said external memory is a mobile device, wearable gadget, smartphone, smartwatch, desktop computer, server, remote storage, internet storage, or internet cloud.

In some embodiments, the optical device of the present invention further comprises:
(1) optical imaging components suitable for operating in the wavelength range of the writing radiation (w) and configured to image the object or scene (1) on the photosensitive layer (101), and
(2) optical imaging components suitable for reading the image spectral range and for imaging the plane of the ORRS (100) on the detector (40), wherein said detector (40) is configured to operate in the same wavelength range of the writing radiation (w).

In other embodiments, the optical device of the present invention further comprises:
(1) optical imaging components suitable for operating in the wavelength range of the writing radiation (w) and configured to image the object or scene (1) on the photosensitive layer (101), and
(2) optical imaging components suitable for reading the image spectral range and for imaging the plane of the ORRS (100) on the detector (40), wherein said detector (40) is configured to operate in the visible range to image the plane of the ORRS (100) on the eye retina.

In still another embodiment, the optical device of the present invention further comprises a phase mask installed in optical communication with and in front of the detector (40) and suitable for changing the phase of the spatially phase- or phase retardation-modulated reading light beam (m), converting said changes into intensity changes on the detector (40) and calculating the phase or phase retardation of the modulated beam from at least three neighbouring pixels of said phase mask, thereby creating an image of the object or scene (1) on the detector (40) with higher dynamic range.

In a certain embodiment, the optical device of the present invention further comprises a wavefront sensor installed in optical communication with and in front of the detector (40) and suitable for converting the spatially phase- or phase retardation-modulated reading light beam (m) into an image of the object or scene (1) on the detector (40), based on measuring the phase or phase retardation, thus improving the dynamic range of the object or scene (1).

In a specific embodiment, said writing radiation (w) is in SWIR, MIR, IR, LWIR, FIR, THz or LW range of the electromagnetic spectrum, and the spatially intensity-modulated reading light beam (m) is in the visible range. In another specific embodiment, the spatially intensity-modulated reading light beam (m) comprises at least one peak or one dip in transmission or reflection spectra, said spectra is suitable for correlation with temperature or emission intensity at each point of the object or scene (1).

In a particular embodiment, the detector (40) is an RGB coloured camera, whereas the spatially intensity-modulated reading light beam (m) comprises three peaks or three dips in transmission or reflection spectra, said three peaks or dips being in the red, green and blue regions of said RGB coloured camera, and the colour changes are suitable for calculation in the external memory and correlation with the temperature at each point of the object or scene (1). In another particular embodiment, the reading light beam is composed of narrowband light, and the detector (40) is a black-and-white camera or grey-scale camera.

In a further embodiment, the voltage waveform and amplitude are adjustable to tune the spatially modulated reading light beam (m) to be in a desired spectral range with an optimum sensitivity.

In yet further embodiment, the external memory of the optical device of the present invention is configured to store two databases of the images received from the detector (40):
(i) a reading light transfer function of the ROASLM (3) stored as a first database for correlating the reading light (r) with the intensity and temperature information obtained from the spatially modulated reading light beam (m), for temperature mapping and pattern recognition applications; and
(ii) a reading light transfer function of the ROASLM (3) stored as a second database for correlating the reading light (r) with the voltage waveform variations in each pixel in a voltage waveform scanning mode.

Various embodiments may allow various benefits and may be used in conjunction with various applications. The details of one or more embodiments are set forth in the accompanying figures and the description below. Other features, objects and advantages of the described techniques will be apparent from the description and drawings and from the claims.

BRIEF DESCRIPTION OF THE DRAWINGS

Disclosed embodiments will be understood and appreciated more fully from the following detailed description taken in conjunction with the appended figures. The drawings included and described herein are schematic and are not limiting the scope of the disclosure. It is also noted that in the drawings, the size of some elements may be exaggerated and, therefore, not drawn to scale for illustrative purposes. The dimensions and the relative dimensions do not necessarily correspond to actual reductions to practice of the disclosure.

Figure 4A:
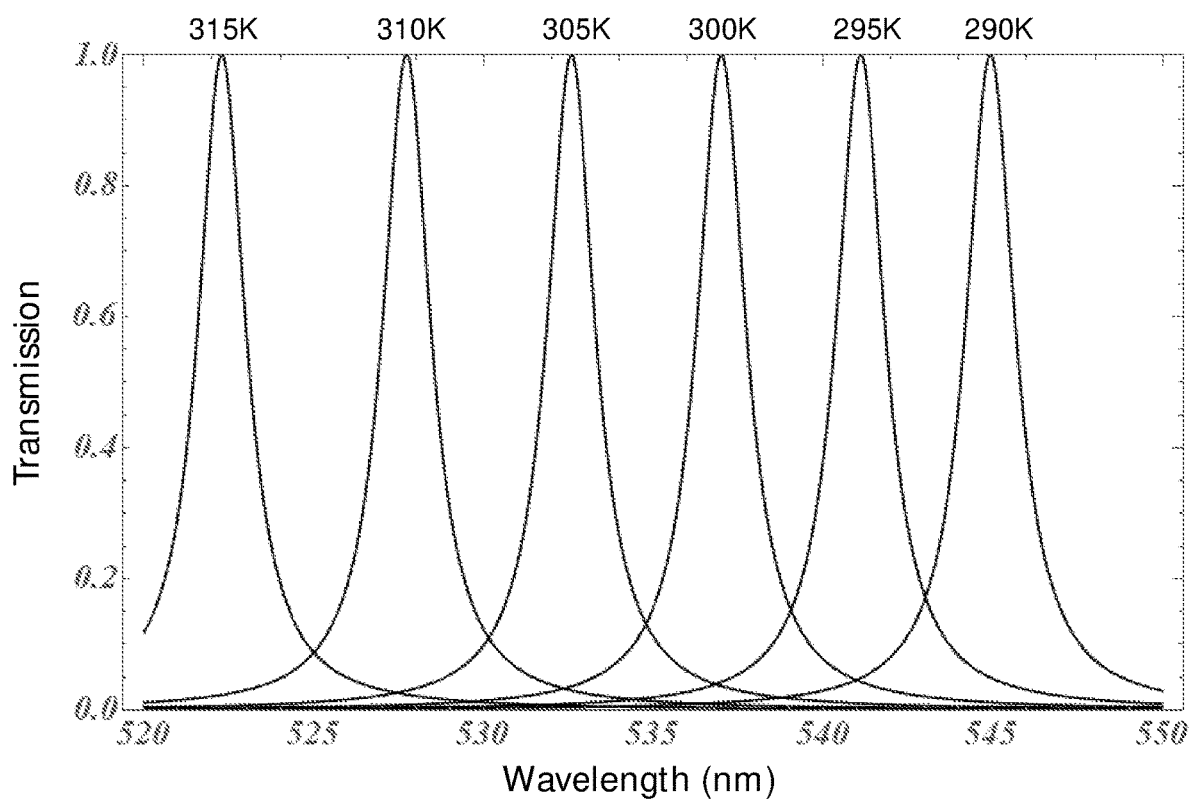
FIGS. 4a and 4b show the transmission spectra through the optically-responsive resonant structure (ORRS) (100)
Figure 4B:
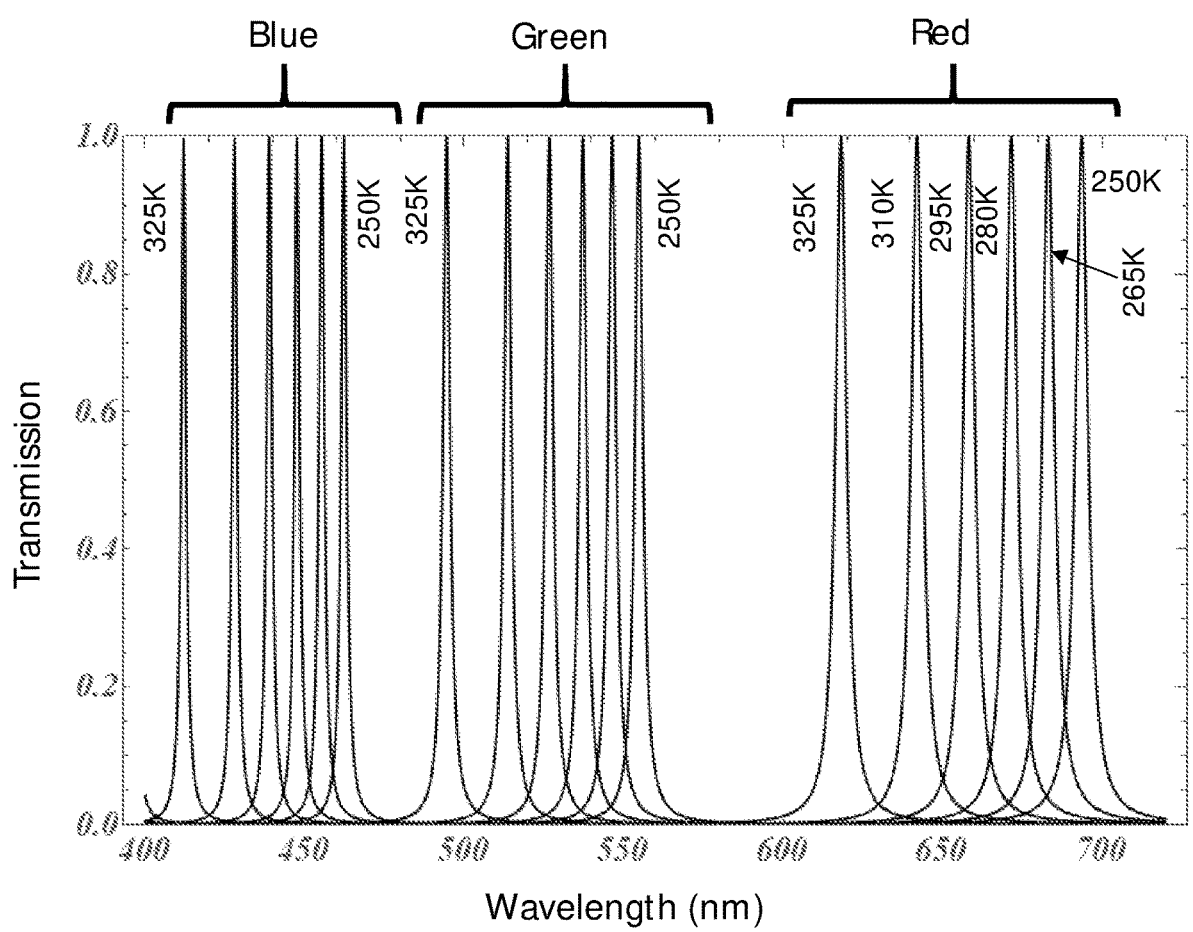

operating in a stand-alone mode or in conjunction with the photosensitive layer (101) at different temperatures. The (ORRS) (100) in the present experiment is a Fabry-Perot cavity which is filled with the Merck E7 liquid crystal mixture and designed to operate in two transmission modes:

FIG. 4a shows the transmission spectrum of the Fabry-Perot cavity having thickness of 300 nm and mirrors reflectivity 98% and designed to give one peak for each temperature in the green region;

FIG. 4b shows the transmission spectrum of the Fabry-Perot cavity having thickness of 720 nm and mirrors reflectivity 92% and designed to give three peaks in the RGB range at each temperature so that the shifts in the peaks are translated into colour variations (each three sets of peaks having the same temperature value produce different colour).

Figure 5:
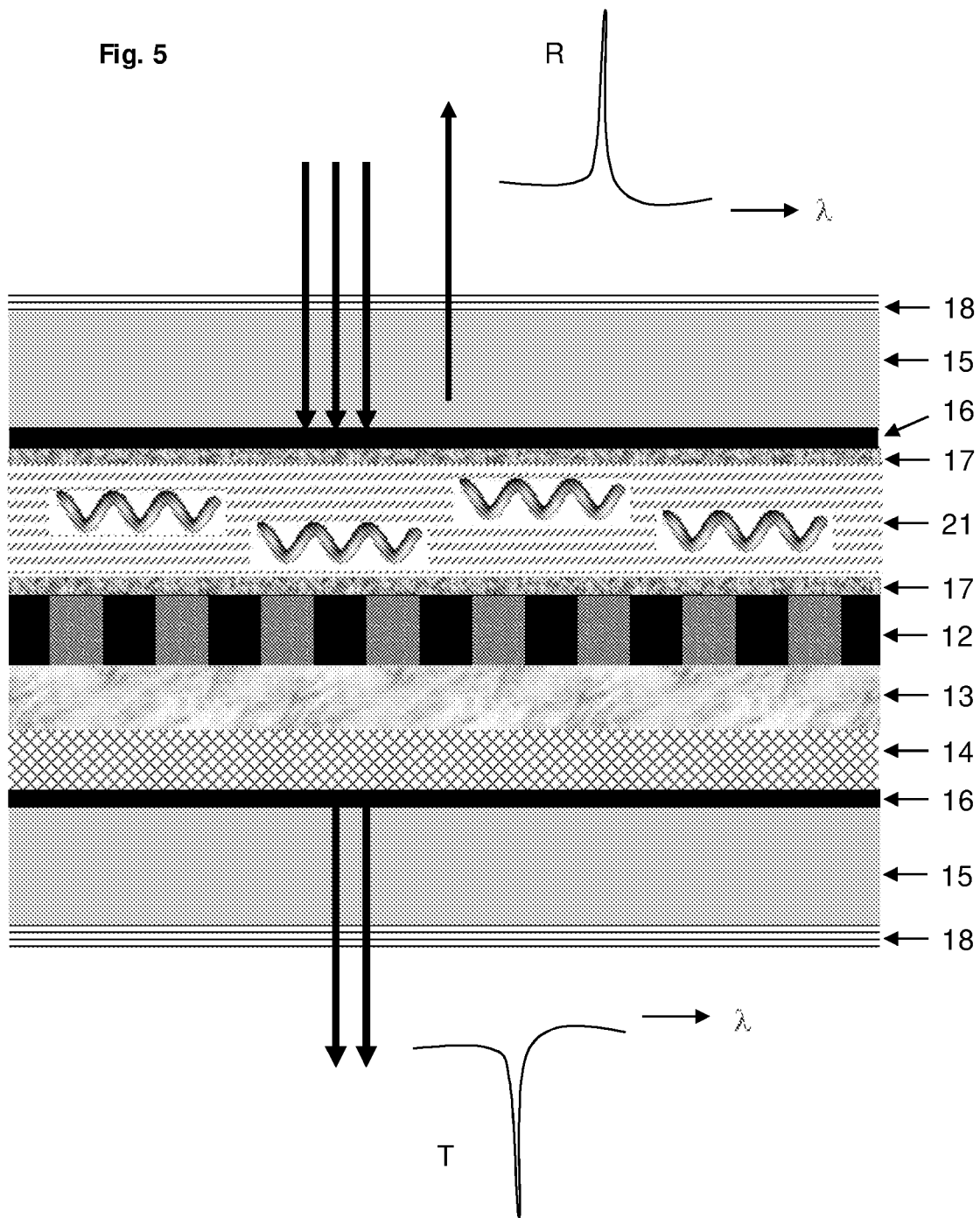

FIG. 5 schematically shows the guided-mode optically-responsive resonant structure (ORRS) (100) of the present invention incorporating a periodic or helical liquid crystal (HLC) layer (21).

DETAILED DESCRIPTION

In the following description, various aspects of the present application will be described. For purposes of explanation, specific configurations and details are set forth in order to provide a thorough understanding of the present application. However, it will also be apparent to one skilled in the art that the present application may be practiced without the specific details presented herein. Furthermore, well-known features may be omitted or simplified in order not to obscure the present application.

The term "comprising", used in the claims, is "open ended" and means the elements recited, or their equivalent in structure or function, plus any other element or elements which are not recited. It should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising x and z" should not be limited to devices consisting only of components x and z. Also, the scope of the expression "a method comprising the steps x and z" should not be limited to methods consisting only of these steps.

Unless specifically stated, as used herein, the term "about" is understood as within a range of normal tolerance in the art, for example within two standard deviations of the mean. In one embodiment, the term "about" means within 10% of the reported numerical value of the number with which it is being used, preferably within 5% of the reported numerical value. For example, the term "about" can be immediately understood as within 10%, 9%, 8%, 7%, 6%, 5%, 4%, 3%, 2%, 1%, 0.5%, 0.1%, 0.05%, or 0.01% of the stated value. In other embodiments, the term "about" can mean a higher tolerance of variation depending on for instance on the experimental technique used. Said variations of a specified value are understood by the skilled person and are within the context of the present invention. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges, for example from 1-3, from 2-4, and from 3-5, as well as 1, 2, 3, 4, 5, or 6, individually. This same principle applies to ranges reciting only one numerical value as a minimum or a maximum. Unless otherwise clear from context, all numerical values provided herein are modified by the term "about". Other similar terms, such as "substantially", "generally", "up to" and the like are to be construed as modifying a term or value such that it is not an absolute. Such terms will be defined by the circumstances and the terms that they modify as those terms are understood by those of skilled in the art. This includes, at very least, the degree of expected experimental error, technical error and instrumental error for a given experiment, technique or an instrument used to measure a value.

As used herein, the term "and/or" includes any and all combinations of one or more of the associated listed items. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached to", "connected to", "coupled with", "contacting", etc., another element, it can be directly on, attached to, connected to, coupled with or contacting the other element or intervening elements may also be present. In contrast, when an element is referred to as being, for example, "directly on", "directly attached to", "directly connected to", "directly coupled" with or "directly contacting" another element, there are no intervening elements present. It will also be appreciated by those of skill in the art that references to a structure or feature that is disposed "adjacent" another feature may have portions that overlap or underlie the adjacent feature.

The present application provides a single pixel LW camera or a thermal camera that uses an optically resonant structure in the visible range, the camera comprises an active thermooptic or electrooptic layer such as a liquid crystal (LC) layer. Metamaterial- and plasmonic-based structures designed to absorb the THz radiation and convert it into heat are possible options for the LW Absorptive layer. Two-dimensional materials such as graphene, black phosphorous and $PbSe_2$ have a broadband response sometimes covering the visible, UV, near infrared (NIR) and SWIR using the same photoconductor. In the present invention, for the sake of clarity, the discussion is mainly focused on thermal cameras. However, the present invention is equally applicable to other short (UV-NIR) or long wave regions (>900 nm), particularly when a photosensitive layer is used in conjunction with the electrooptic material such as liquid crystals.

Figure 2A:
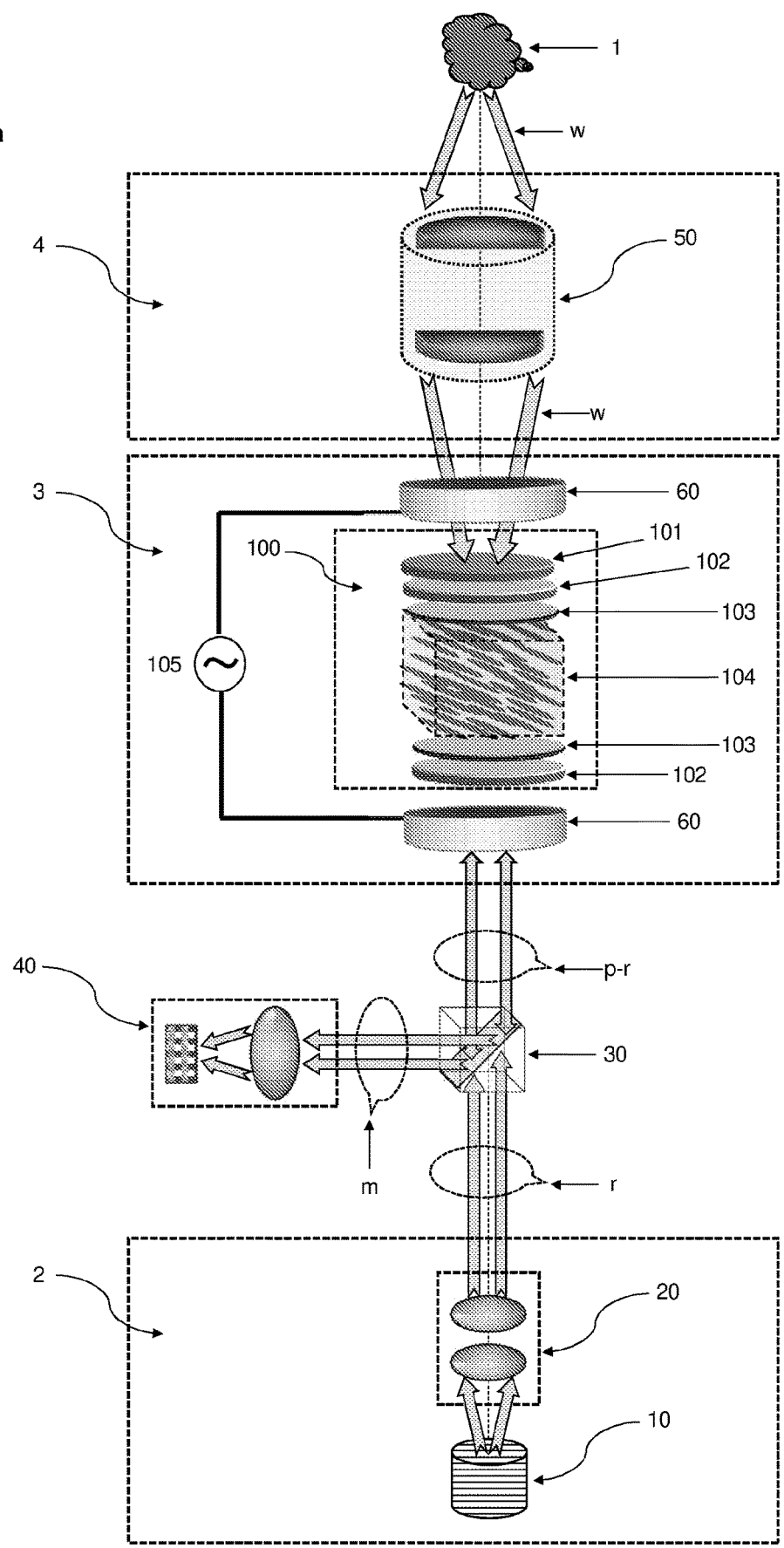
FIGS. 2a and 2b schematically show an optical device of the present invention, configured to operate in reflection mode (shown in FIG. 2a) or in transmission mode (shown in FIG. 2b).
Figure 2B:
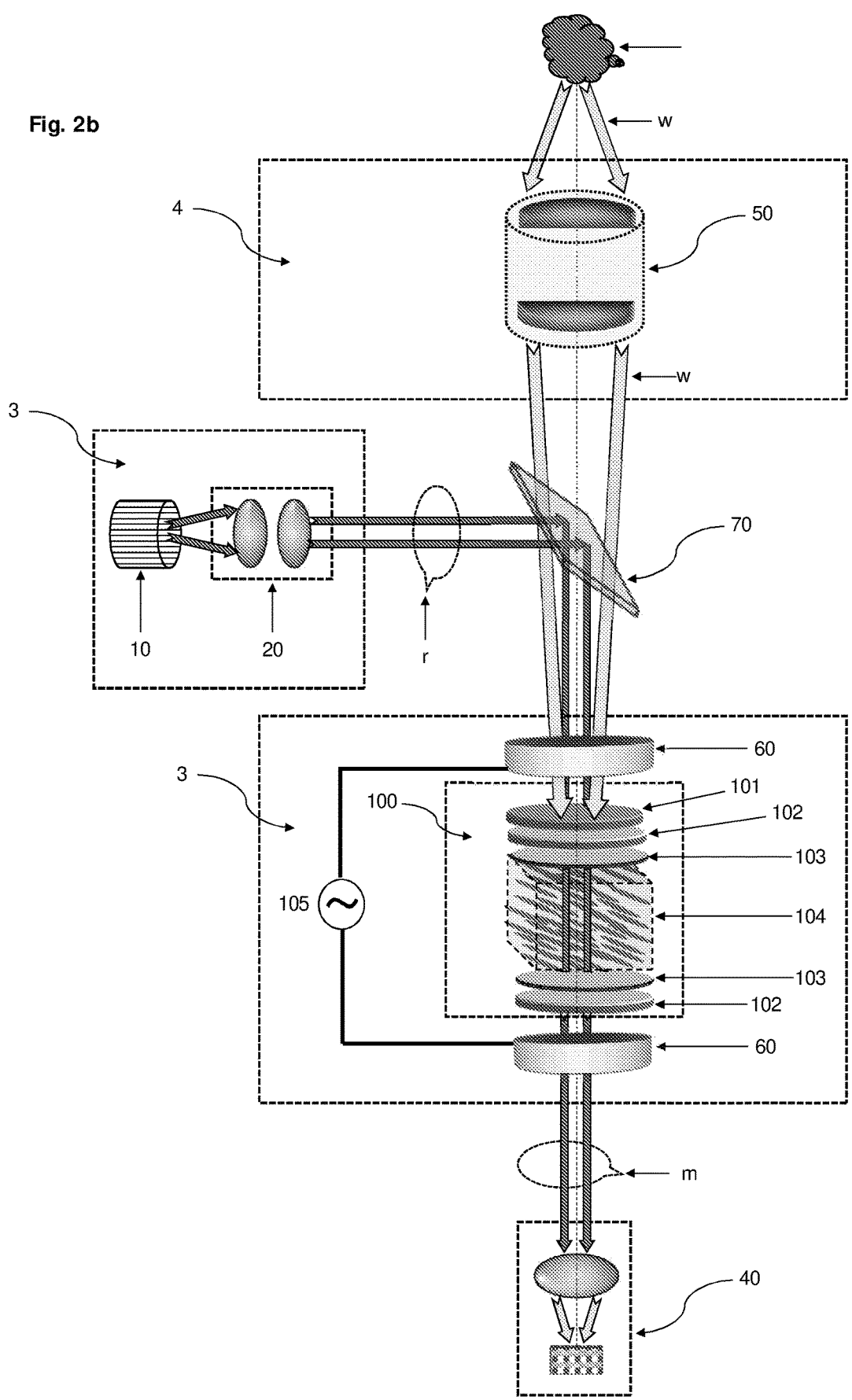

Reference is now made to FIGS. 2a and 2b illustrating an optical device of the present invention, suitable for imaging of an object or scene (1) emitting a writing long-wave radiation (w), said device configured to operate in reflection mode (shown in FIG. 2a) or in transmission mode (shown in FIG. 2b) and comprises:

A. A reading light unit (2) comprising:
  (a) A light source (10) configured to generate a reading light beam and to direct said reading light beam onto a collimator (20);

(b) The collimator (20) in optical communication with said light source (10), said collimator is an optical assembly of curved mirrors or lens designed to collimate said reading light beam, thus forming a collimated reading light beam (r), and to direct said collimated reading light beam (r) onto a resonant optically-addressed spatial light modulator (ROASLM) (3);

B. A writing light unit (4) in optical communication with the ROASLM (3) and comprising an optical assembly (50) designed to receive the writing radiation (w) from the object or scene (1) and to project said writing radiation (w) onto a photosensitive layer (101) of the ROASLM (3), thereby writing an image of the object or scene (1) on said photosensitive layer (101);

C. The ROASLM (3) in optical communication with the reading light unit (2) and with the writing light unit (4), said ROASLM (3) is configured to receive the polarised collimated reading light beam (p-r) from the reading light unit (2) and the writing radiation (w) from the writing light unit (4), and to modulate said reading light beam (p-r) with said writing radiation (w), thus converting long-wave images of said object (1) into visible-range images or finding colour changes or spectral content of said writing radiation (w), said ROASLM (3) comprises:
a) an optically-responsive resonant structure (ORRS) (100) designed to receive the writing radiation (w) from the writing light unit (4) onto the photosensitive layer (101) of said ORRS (100), thereby writing an image of the object (1) on said photosensitive layer (101), to transform light distribution created by said image into a stimulating signal suitable for modulating the reading light beam (p-r), and to direct a thereby obtained spatially intensity-modulated reading light beam (m) to a detector (40), thus creating resonance-type variations of the received spatially intensity-modulated reading light beam (m) upon the change caused by the stimulated signal;
b) a substrate (60) comprising an inner layer of a transparent conducting electrode (TCE) for applying voltage to the ORRS (100) and an outer dielectric anti-reflection coating (ARC) layer for minimising unwanted reflections; and
c) a voltage source (105) designed to provide a voltage waveform to the substrate (60) and to a conversion layer (104) of the ORRS (100) for optimising the voltage division between the photosensitive layer (101) and the conversion layer (104) upon receiving the writing radiation (w), thus maximising the contrast of the spatially intensity-modulated reading light beam (m);

D. A detector (40) in optical communication with the ROASLM (3), said detector (40) is suitable for observing, detecting, reading and/or performing acquisition of the spatially intensity-modulated reading light beam (m) received from the ROASLM (3) to create visible-range images or detect colour changes or spectral content of the writing radiation (w) of the object or scene (1) emitting said writing radiation (w), and optionally to transmit said visible-range images or said spectral content of the writing radiation (w) to an external memory or user's interface; and E1. Provided that said device is configured to operate in the reflection mode, the device further comprises a polarising device (30) installed between and in optical communication with the reading light unit (2), the ROASLM (3) and the detector (40), said polarising device (30) is either:

(i) a polarising beam splitter configured to receive the incident collimated reading light beam (r) from the collimator (20) of the reading light unit (2), to split said collimated reading light beam (r) into two separate, linearly polarised, collimated beams either reflected (s-r) or transmitted (p-r) with orthogonal polarisation, and to direct the polarised collimated reading light beam (p-r) to the ROASLM (3), thereby converting phase retardation changes of said collimated reading light beam (p-r) reflected from the ROASLM (3) into intensity variations expressed in the spatially intensity-modulated reading light beam (m); or (ii) a polariser configured to receive the incident collimated reading light beam (r) from the collimator (20) of the reading light unit (2), to generate the polarised collimated reading light beam (p-r), and to direct said polarised collimated reading light beam (p-r) to the ROASLM (3) through an analyser configured to convert the retardation or polarisation modulation of said polarised collimated reading light beam (p-r) into the spatially intensity-modulated reading light beam (m); or (iii) a polariser designed to receive the incident collimated reading light beam (r) from the collimator (20) of the reading light unit (2), to generate the polarised collimated reading light beam (p-r), and to direct said polarised collimated reading light beam (p-r) to the ROASLM (3); or E2. Provided that said device is configured to operate in the transmission mode, the device further comprises a dichroic mirror (70) installed between and in optical communication with the reading light unit (2), the ROASLM (3) and the writing light unit (4), said dichroic mirror (70) is configured to receive the incident collimated reading light beam (r) from the collimator (20) of the reading light unit (2), to reflect said reading light beam (r) and direct it to the ROASLM (3), and to transmit the writing radiation (w) emitted by the object or scene (1) to the ROASLM (3);

characterised in that said ORRS (100) comprises:

(a) The photosensitive layer (101) in optical communication with the substrate (60), said photosensitive layer (101) is deposited on a transparent substrate and is suitable for absorbing the writing radiation (w) in a form of the long-wave image of the object or scene (1) and transforming said image into the stimulating signal across the ORRS (100);

(b) Optical layers (102) adjacent to the photosensitive layer (101) and suitable for inducing resonance effect to the stimulating signal formed in the ORRS (100);

(c) Optional alignment layers (103) adjacent to the optical layers (102) and suitable for aligning liquid crystal molecules; and (d) The conversion layer (104) adjacent to the optical layers (102) or to the alignment layers (103) and suitable for converting the resonant long-wave image of the object or scene (1) into a visible-range image.

According to the present invention, the terms "reading light beam" or "reading radiation" stand for the light beam or radiation that reads information written on the responsive, photosensitive layer (101), such as the liquid crystal layer. The reading radiation is in the visible range and can be detected with a Si-based camera or our eyes. The terms 'writing radiation' or "stimulating signal" stand for the radiation that writes information on the responsive, photosensitive layer (101) or in other words stimulates a signal in the photosensitive layer (101). This signal is stimulated by the "long-wave range" (LW) defined as a wavelength range of wavelengths larger than those detected by the Si-based cameras. The LW radiation can be from natural sources or from an external source to provide the writing LW light, for example microscope light.

The responsive, photosensitive layer (101), which is also called "an absorptive layer" is the layer that receives the writing radiation (w) and converts it either into electrical signal or into heat. For example, the absorptive layer may comprise at least one pixel of a bolometric layer, a microbolometric layer array, a pyrometric layer, a photovoltaic layer sensitive to the writing radiation (w), a photodiode structure, a phototransistor layer, a back to back photodiode structure, a liquid crystal layer absorbing in the infrared range, a THz absorptive layer, an infrared absorptive layer, an absorptive layer under total internal reflection conditions, in which broadband lossy modes are excited, or a black body-type layer that converts the infrared radiation into heat. The absorptive or photosensitive layer (101) can be single- or multi-layered, depending on the application (for example, a semiconductor photodiode has several layers, whereas a bolometric layer is basically single, and an absorbing layer that converts infrared light into heat can be a single layer or multi-layers).

The top surface of the conversion layer (104), made for example from liquid crystal, is coated with alignment layers (103) designed to align molecules, such as liquid crystal molecules, of the conversion layer (104), and optionally with layers of resonant photonic structures, such as mirror layers of a Fabry Perot cavity, or a grating layer. The substrate (60) and optionally the conversion layer (104) are coated with a transparent conducting electrode (TCE) for applying voltage to the optically-responsive resonant structure (ORRS) (100), and with an outer dielectric anti-reflection coating (ARC) layer. The conversion layer (104) is usually held with spacers and it is glued on the surrounding. The spacers determine the thickness of the conversion layer (104) and connect its two bounding surfaces together.

The "spectral content" of the writing radiation is a sum of the spectra components (having certain wavelengths) contained in the writing radiation. When the spectral content of the writing radiation is determined, the device of the invention can be used as a spectrometer in the long wave range (instead of imaging or optical processing).

The aforesaid polarising beam splitter of the polarising device (30) for the reflection mode configuration is designed to split unpolarised light into two polarised parts by polarisation state rather than by wavelength or intensity. The polarising beam splitter is used in semiconductor or photonics instrumentation to transmit p-polarised light while reflecting s-polarised light. They are typically designed for 0° or 45° angle of incidence with a 90° separation of the split beams, depending on the configuration. An example of the beam splitter (30) can be a wire grid polariser.

In the reflection mode configuration shown in FIG. 2a, the two beams received from the visible light source (10) are polarised by the polarising beam splitter (30).

The light source (10) is selected from a laser, a light-emitting diode (LED), a laser diode, a wide-spectrum halogen lamp, an arc-lamp and a mercury-vapour lamp. The detector (40) is selected from an electron-multiplying charge-coupled device (EMCCD) imager, a charge-coupled device (CCD) imager, an avalanche photodiode (APD), a photomultiplier tube (PMT), scientific complementary metal-oxide-semiconductor (sCMOS) imager and CMOS imager of a smartphone camera, a stand-alone camera, or a camera of any mobile device or gadget.

The detector (40) optionally comprises a focusing apparatus and a computer link. In a specific embodiment, the detector (40) is a CMOS imager of a smartphone camera. In addition, the detector (40) may be an assembly of lens and image sensors, for example a camera with lens, an eye, or an array of detectors for the visible range combined with lens system or mobile phone camera with its lens.

In some embodiments, the detector (40) is designed to generate raw data from a spectral content of the long-wave radiation as a video or as a series of static images and to further process said raw data to provide information on an object emitting long-wave writing radiation (w) to output said information to an external memory or user's interface. The external memory can be a mobile device (such as a smartphone, smartwatch or any wearable gadget alike), desktop computer, server, remote storage, internet storage, or internet cloud.

Thus, the ROASLM (3) of the present invention is suitable for converting long-wave images into visible-range images, finding spectral content of long-wave radiation and modulating a reading radiation at multiple wavelengths using an incident writing radiation (w) having different spectral content.

Liquid crystals are known to have strong electrooptic effect and thermooptic coefficient particularly near their transition temperature of the order of $10^{-3}$-$10^{-2}$ RIU (refractive index units)/K, while for most solid materials, this value is at least two orders of magnitudes less ($10^{-6}$-$10^{-5}$ RIU/K). Moreover, for some organic materials, this value is an order of magnitude less, for example it is about $10^{-4}$ RIU/K for polymethylmethacrylate (PMMA). Besides, liquid crystals (LC) exhibit strong electrooptic effects and their refractive index variation upon applying voltage is in the order of their molecular birefringence value, which is typically 0.1-0.3 but can also reach 0.5-0.7, with some special LC compounds.

There are many LC modes that can be used such as ferroelectric, helical, flexoelectric, in-plane switching, twisted nematic, vertically aligned, smectic, cholesteric, blues phases, as well as LC composites and more, however here we concentrate on the nematic phase in the planar geometry as an example, but it should be understood that the invention is general and can use any LC mode. Due to all these reasons our preferred embodiment is to use LCs as the thermooptic and electrooptic or megnetooptic material to be used in this invention. Other materials are not excluded, for example poly(methyl methacrylate) (PMMA), that can be used together with a high Q-value of resonant structure to give a strong optical effect in response to small temperature variation. For example, as a waveguide in the guided mode resonance structure or as a thick resonant grating material revealing ultra-narrow resonances sensitive to temperature. For most of the requirements, the LC layer has advantages and therefore more details on its functionality are given below.

The optically resonant structure together with the photosensitive layer (101), such as the liquid crystal layer, are defined in the present specification as the "optically responsive resonant structure" (ORRS) (100). As mentioned above, the ORRS (100) can be comprised of several layers, continuous and patterned films deposited on substrate or between two substrates, alignment layers, anti-reflection coatings and transparent electrodes. Non-limiting examples of the ORRS (100) are structures comprising a liquid crystal, for instance the liquid crystal in a Fabry-Perot cavity, optionally in conjunction with a resonant grating structure, and filling porous photonic crystal structure such as porous Si structures, in which external stimuli can induce a drastic response change, which leads to exhibiting sharp spectral resonances in the optimised structure.

Figure 3:
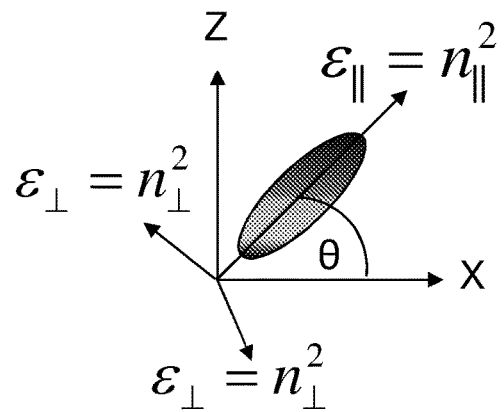
FIG. 3 schematically shows a liquid crystal molecule with its principal refractive indices.

The refractive indices of nematic LCs and their molecular birefringence are experiencing a critical behaviour with temperature as follows in the visible range:

$$n_\| = A - BT + 2\Delta n_0 \left[1 - \frac{T}{T_c}\right]^\alpha, \quad (1a)$$

$$n_\perp = A - BT - \frac{2\Delta n_0}{3}\left[1 - \frac{T}{T_c}\right]^\alpha, \quad (1b)$$

$$\Delta n_m = \frac{8\Delta n_0}{3}\left[1 - \frac{T}{T_c}\right]^\alpha, \quad (1c)$$

where $n_{\|,\perp}$, are the refractive indices along and perpendicular to the LC molecules (see FIG. 3), and their difference is the molecular birefringence $\Delta n_m = n_\| - n_\perp$.

Typical values of the different constants A, B, $\Delta n_0$, $\alpha$ and $T_c$ for Merck liquid crystals of the type E7 are A=1.75, B=5.36×10$^{-4}$, $\Delta n_0$=0.24, $\alpha$=0.377 and $T_c$=333° K. Considering for example the parallel index, its thermooptic coefficient is:

$$\frac{dn_\|}{dT} = -B - \frac{2\alpha\Delta n_0}{T_c}\left[1 - \frac{T}{T_c}\right]^{\alpha-1}, \quad (2)$$

which at room temperature is around $-3\times10^{-3}$ RIU/K, whereas near the transition it approaches the value of 0.01 RIU/K.

Similarly, from Eqs. 1a-1c it can be easily seen that the thermooptic coefficient for $n_\perp$ is smaller by a factor of three, while for the birefringence it is larger by a factor of 4/3. When LCs are combined with a resonant photonic structure such as a cavity, grating, or photonic crystal, or the guided-mode-resonance structure, the optical readout can be made of a very narrow optical signature (peak or dip) and the changes in the refractive index reveal shifts in the resonances. The narrower the resonances, the higher the sensitivity of the intensity changes to the temperature variations. This is the essence of the present invention. The structure can be designed to operate in the visible range using a single wavelength light source, such as an LED or laser diode.

There are many electrooptic effects in LCs, but the present invention is mainly focused on the nematic LC mode in the parallel alignment geometry for clarity reasons. In this case, for light propagating along the z-axis (normal incidences), the extraordinary refractive index (for polarisation along the x-axis) and the ordinary refractive index (polarisation along y-axis) as well as the effective birefringence of the molecule are expressed as:

$$n_e = \frac{n_\perp \eta_\|}{\sqrt{n_\perp^2 + (n_\|^2 - n_\perp^2)\sin^2\theta}}; \; n_o = n_\perp; \; \Delta n = n_e - n_o, \quad (3)$$

where the molecular director angle $\theta(z,V,T)$ is a function of the coordinate z, the voltage and the temperature and can vary between 0 and 90 degrees, leading to birefringence variation between zero and $\Delta n_m = n_\| - n_\perp$.

Reference is now made back to FIG. 2a schematically showing an optical device of the present invention, configured to operate in reflection mode. The optical device of the present invention is actually a thermal or long-wave imager comprising three major components, which provide functionality of the device according to the present invention:

a) The photosensitive layer (101) in optical communication with the substrate (60), said photosensitive layer (101) is deposited on a transparent substrate and is suitable for absorbing the writing radiation (w) in a form of the long-wave image of the object or scene (1) and transforming said image into the stimulating signal across the ORRS (100);

b) Optical layers (102) adjacent to the photosensitive layer (101) and suitable for inducing resonance effect to the stimulating signal formed in the ORRS (100); and c) The conversion layer (104), for example a LC layer, adjacent to the optical layers (102) and suitable for converting the resonant long-wave image of the object or scene (1) into a visible-range image.

Non-limiting examples of resonance-inducing optical layers (102) used in the present invention are a Fabry-Perot cavity, guided mode resonance, resonant grating, which is described in a paper by Ibrahim Abdulhalim, "Optimized guided mode resonant structure as thermooptic sensor and liquid crystal tunable filter", Chinese Optics Letters 7 (8), 667, 2009, or porous Si 1D photonic crystal with highly porous defect layer in the centre as described in Shahar Mor et al, "Planar polar liquid crystalline alignment in nano-structured porous silicon one dimensional photonic crystals", Appl. Phys. Lett. 97, 113106, 2010.

In one configuration of the optical device of the present invention, the photosensitive layer (101) is needed and meant to be a layer similar to the ones used in uncooled thermal detectors, such as pyrometers or bolometers and as a first priority not based on photoconductivity effect that generates photocarriers. Although photoconductive or photovoltaic layers such as semiconductors are not excluded, our first priority is the ones not based on photogenerated charge carriers. The latter cases are not the most desirable because usually they need to be cooled to minimise the dark current in particular when they form a large area, however for the short-wave case, such as UV-SWIR, they may be used with the resonant liquid crystal structure with the advantage of creating a cost-effective single pixel camera. When such layers are used then pixelated structure will be preferable since the dark current depends on the pixel area and maybe minimized by using small pixels. Another advantage of using an array of pixels is to minimize the lateral diffusion of photocarriers or heat flux, thus increasing the resolution.

Asi Solodar et al, in "Infrared to visible image up-conversion using optically addressed spatial light modulator utilizing liquid crystal and InGaAs photodiodes", Appl. Phys. Lett. 108, 021103-6p, 2016, described a single pixel camera using InGaAs photodiode array and non-resonant liquid crystal layer for the SWIR range. However, in that publication, the LC layer is not resonant layer and therefore, the sensitivity is lower. The optical device of the present invention is much more advantageous over the device of Asi Solodar et al (2016), because it uses a resonant structure and extends the use beyond semiconducting photosensitive layers, such as thermal sensors. In addition, the present invention discloses the possibility of detecting the phase or phase retardation modulation thus increasing the dynamic range.

Organic photosensitive layers (101) can also be used. An example is the TRPA1 protein used by some snakes to detect bodies with temperatures higher than 301K at night. One of the aspects of the present invention is such a layer that generates resistivity (bolometric) or voltage (pyroelectric) or simply heat from the IR radiation.

Another configuration of the optical device of the present invention does not use the physical photosensitive layer (101) but uses the fact that the liquid crystal molecules somewhat absorb in the IR region. Each one of the device configurations will be described separately.

In the first configuration of the optical device of the present invention, the photosensitive layer (101) generates a stimulus that changes the conversion layer (104) and this change can then be read with a visible light in reflection usually, but also possible in transmission mode. This is similar to a conventional optically-addressed spatial light modulator (OASLM), however according to the present invention, the optical device comprises the conversion layer (104), such as a liquid crystal layer, being part of a resonant structure to improve the sensitivity. Therefore, the optically-addressed spatial light modulator in the present invention is defined as a "resonant optically-addressed spatial light modulator" (ROASLM) (3). For the resistivity change mode, a voltage is applied on the optical device of the invention and the resistivity variation on the bolometric layer are translated into voltage variations across the conversion layer (104). Since the conversion layer (104) is part of the resonant device, the narrow optical signature (reflection dips or peaks) can be designed to be with high quality factor (Q factor) and thus will be highly sensitive to the temperature. If a pyroelectric material is used, then the voltage generated will be causing orientational variation of the liquid crystal molecules, thus changing the high Q-factor optical signature. Additional electrical circuit elements can be incorporated to improve the induced stimulating signal such as an integrated amplifier.

In the second configuration, the cavity material itself, such as liquid crystal, is absorbing the IR radiation, get heated and therefore, its effective refractive index changes because of its high thermooptic coefficient value, thereby causing the high Q-factor optical signature to vary. Reference is now made to FIGS. 4*a* and 4*b* showing transmission through the ORRS (100), which operates in a stand-alone mode or in conjunction with the photosensitive layer (101) at different temperatures. The resonant device is a Fabry-Perot cavity which is filled with the Merck E7 liquid crystal mixture and designed to operate in two transmission modes. FIG. 4*a* shows the transmission spectrum of the Fabry-Perot cavity having thickness of 300 nm and mirrors reflectivity 98% and designed to give one peak for each temperature in the green region. FIG. 4*b* shows the transmission spectrum of the Fabry-Perot cavity having thickness of 720 nm and mirrors reflectivity 92% and designed to give three peaks in the RGB range at each temperature so that the shifts in the peaks are translated into colour variations (each three sets of peaks having the same temperature value produce different colour).

As shown in FIG. 4*a*, the first mode is designed to give one peak within the visible range, in this case shown in the green region, so when read with a green LED or green filter the image is seen as intensity variations. As shown in FIG. 4*b*, the second mode is designed to give three peaks at each temperature, one in the blue region, one in the green and one in the red region. In FIG. 4*a*, the curves are calculated with 5K interval each, demonstrating that it is possible to distinguish by fractions of degree. As the heat temperature approaches the phase transition temperature of E7 liquid crystals, the sensitivity increases. In FIG. 4*b*, each set of peaks having different colours corresponds to one temperature in steps of 15K in the range of 250-325K. The reading light is polarised along the extraordinary axis. The idea behind this mode is to translate the temperature or LW intensity variations into colour variations using a conventional coloured RGB camera and then to be able to measure temperature using coloured camera and simple white LED source. The contrast variation of the peaks appearing in the spectrum shown in FIG. 4*b* is more than 90% for each 15K step. It is thus clear that using a coloured RGB camera, it is possible to distinguish between fractions of a degree of temperature. The resolution can be improved further by increasing the finesse of the cavity. The cavity size is 720 nm in the present experiment, meaning that the device is fast with response time less than few milliseconds when voltages are applied. Therefore, a high-speed camera can be built based on this configuration.

The voltage scanning is another approach in which only a single wavelength source is used, the voltage is scanned while the images are recorded and the voltage map that gives the maximum signal is built. This maximum voltage is related to the temperature at each point in the image, because the voltage tunes the extraordinary refractive index and causes a peak to shift.

Figure 1:
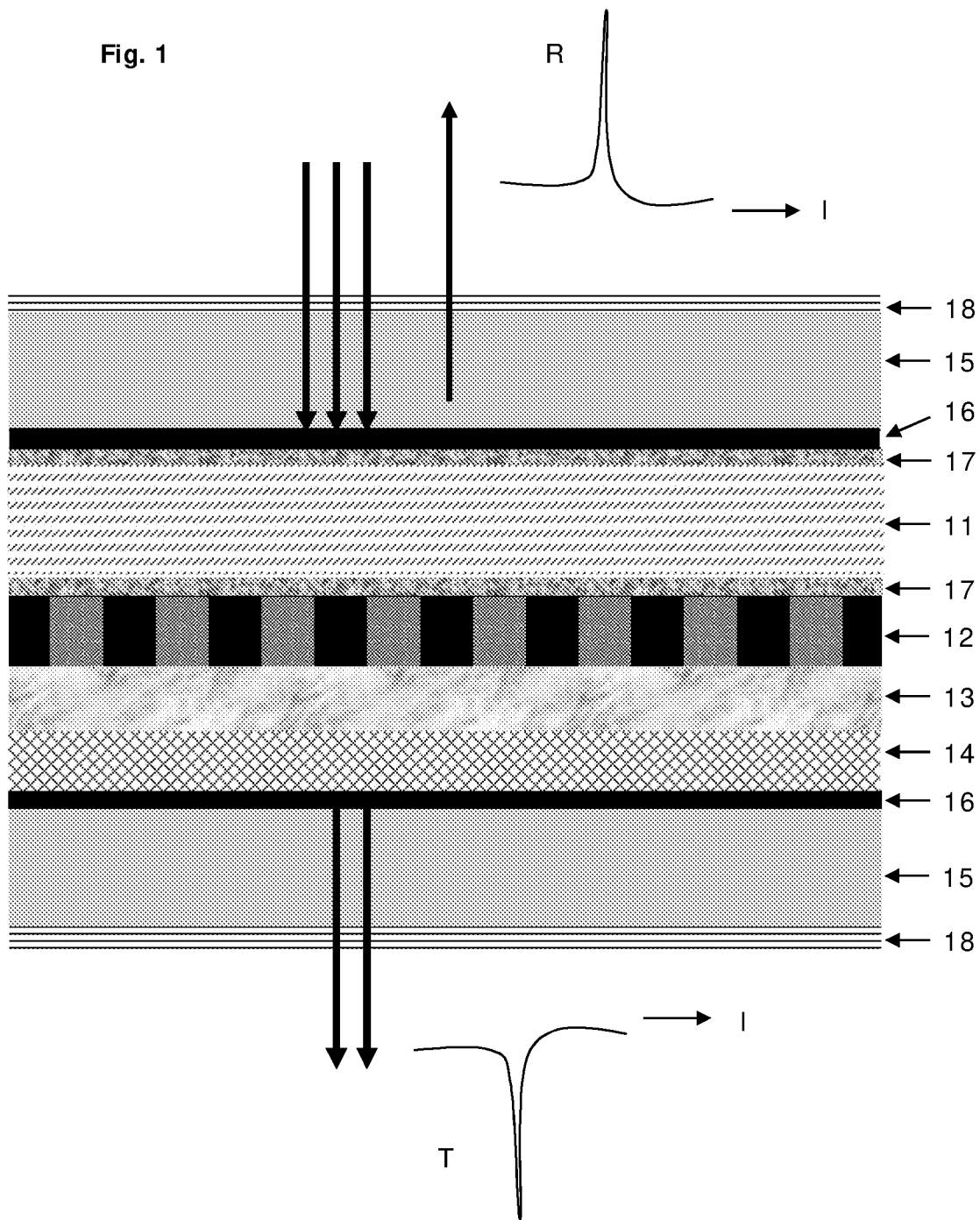
FIG. 1 schematically shows a guided mode resonance structure.

In another embodiment, the ORRS (100) is selected from a guided mode structure, a thick high-contrast grating structure, or any photonic crystals structure designed to produce multiple peaks in the visible range, which will shift upon the incident IR or LW radiation and change the colour. Helical LCs, in particular such as cholesterics, chiral smectics, blue phases and tilted conical phase are used in these ORRS (100) structures, because in addition to the birefringence modulation with temperature or voltage, the period can also change, thus enhancing the output optical signature sensitivity. The number of peaks is a function of the LC layer thickness, as well as the grating and waveguide thicknesses. While FIG. 1 schematically shows the guided-mode resonance structure incorporating the liquid crystal layer (11), FIG. 5 schematically shows the guided-mode optically-responsive resonant structure (ORRS) (100) of the present invention incorporating a periodic or helical liquid crystal (HLC) layer (21), which replaces the grating layer in order to generate the light coupling to the waveguide. The HLC layer (21) can be oriented such that the helix axis is in the plane of the substrates, perpendicular to it or tilted at an angle.

The helix axis in FIG. 5 is meant to be in the plane of the substrates so that it acts by itself as the grating that couples the light to the waveguide. Since the resonance wavelength is determined by the effective refractive index of the guided mode, as well as the period of the grating, higher sensitivity and wider dynamic range are expected. Both short pitch and large pitch modes can be incorporated, for example the distorted helix ferroelectric (DHF) mode or the short pitch cholesteric mode. The HLC structure with the helix lying in the plane of the substrates behaves in principle as an anisotropic grating which can diffract light depending on the polarisation and the wavelength. When the period is smaller than the wavelength, the grating becomes a zero-order grating and no diffraction occurs. In the latter case, the structure acts as a tunable birefringent plate with the optic axis rotating in the plane of the substrates as the voltage varies. When the HLC is diffractive, then the diffraction pattern can be analysed and correlated with the temperature variations.

In a further embodiment, the HLC layer (21) is used as a modulating layer. When a voltage is applied to the HLC layer, the helix starts to distort and several electrooptic effects arise, such as the period starts to increase, the effective birefringence changes and/or the effective optic axis reorients in the plane of the substrates. The behaviour of the HLC-based device with the applied electric field depends strongly on the ratio between the wavelength to the period. For example, in the guided-mode-resonance (GMR) structure described above, more electrooptic effects can arise such as the coupling of the light to the waveguide by virtue of the HLC as a grating.

Another important property of the HLCs or periodic liquid crystal structures is that their selective reflection peaks are sensitive to temperature such as with cholesteric, blue phases or chiral smectic liquid crystals. Cholesteric LCs and blues phases can be engineered to appear at room temperature with selective reflection in the visible range, for example, by mixing a chiral dopant such as CB15 with nematic LC such as BL036 (available from MERCK) at nearly equal ratio. In this case, it is possible to have the helical LC inside a cavity, parts of resonating photonic structure or simply by itself, and to monitor its selective reflection peaks as the optical signatures sensitive to the thermal or the LW field. One of the advantages of having the HLC inside the Fabry-Perot cavity is the fact that the transmission peaks are mostly polarisation-independent.

When the first configuration or the p-Si photonic crystal geometry is used, the optical device of the present invention will operate in reflection mode. In such case, instead of a peak in reflection, there will be a dip in reflection. The same methodology of colour detection can also work in reflection mode and used with dip signature, rather than a peak. The same is also possible using the voltage scanning mode, but in that case one needs to look for the voltage map that gives the minimum signal at each point. Using the resonant grating geometry described in the aforementioned publication by Shahar Mor et al (2010), a peak in reflection is observed and it is possible to design it so that three peaks are obtained in the blue, green and red regions at each temperature.

Calibration of the device is another important embodiment particularly for temperature mapping or pattern recognition. For this, a first database of the output reading light versus the writing light intensity or temperature is measured with a known source and stored. When an object with different writing intensity is imaged, the stored database is used to find the temperature map of the object. Another mode uses the voltage waveform scanning mode. As the voltage amplitude, frequency or duty cycle of the applied waveform on the LC layer affect its response, a second database is generated for the waveform reading light output versus the waveform variation. Intensity at each pixel versus voltage is then correlated with the intensity or spectrum of the long-wave radiation and based on the first and second databases, the temperature, spectrum or intensity maps of the long-wave radiation are determined. The same approach can be used when the device is used for long-wave spectral analysis using a dispersive element combined with the ROASLM as mentioned above.

Fabrication and Design Considerations

Fabry-Perot design and fabrication: Since the cavity thickness is preferably being small, as shown before it is less than 1000 nm, the uniformity becomes crucial. In order to obtain such a uniform cavity, the substrates can be etched to the depth equals to the desired gap, then deposit the necessary layers for the mirrors. For the cavity mirrors two methods will be used.

The first method uses standard dielectric mirrors directly deposited on the ITO coated glass substrates or having the ITO layer somewhere in between the multilayers. Sivan Isaacs et al, in "*Investigation of Liquid Crystal Fabry Perot Tunable Filters: Design, Fabrication and Polarization Independence*", Applied Optics 53, H91-H101 (2014) described designing and fabricating these mirrors. The deposition can be done in commercial thin film deposition companies. When an IR absorptive layer (104) is used, it will be considered in the simulations and it will be located only on one of the substrates adjacent to the LC layer because usually these layers are not perfectly transparent to the visible light. The device operates in reflection mode in this case.

The second method uses p-Si technology as described above. The aforementioned paper by Shahar Mor et al (2010) described using p-Si 1D-PC structure filled with LC and showed how the reflection peak from such a photonic crystal get split because of the e and o modes, with their splitting determined by the birefringence of the LC. One of the preferable modes is to use such photonic crystal structure to give much narrower peaks so that the splitting is much more pronounced and gives higher resolution thermal imaging. The structure is basically two 1D-PCs and a defect layer in between. The defect layer acts basically as the cavity gap of a Fabry-Perot structure, so it leads to a narrow dip in reflection. Therefore, it is desirable to have this layer with high porosity in order to have it mostly filled with the LC. The top LC layer acts as a reservoir to fill the entire p-Si structure with the LC. When working with e-polarised light, the reflection region of each mirror (each side of the cavity) will shift slightly, but it will not affect its functionality as a mirror. The dip in reflection will remain near the centre of the mirrors reflectivity which is advantageous over non filled mirrors.

Resonant grating design and fabrication: The design of these structures is done using rigorous electromagnetic simulations tools such as G-Solver and COMSOL. High index transparent materials can be used such as Si, $TiO_2$ or $Si_3N_4$. The fabrication can be done by specialised vendors as required in large area of at least 5×5 mm and preferably more, for example, Lionex in Holland or the INL in Portugal or ECI in the USA. The idea of having the spaces empty between the lines is superior because it enhances the sensitivity of the resonance to the LC refractive index variations. As mentioned, other grating based resonant structures are possible and we are not limited to this one particularly if the coloured RGB camera mode is used in which the colour will be the indicator of the temperature relying on several reflection or transmission signatures in the RGB regions. The plasmonic-based grating structure designed recently in the present invention is an exemplary structure which shows more than one plasmonic dip in reflection can also be used.

Long-wave or thermal absorptive layers (101): Bolometric and pyroelectric layers can be deposited using sputtering or other thin film deposition techniques. Some of today's thermal cameras are based on micro-bolometer arrays in which each pixel contains an electrical circuit to convert the resistance changes to voltage changes with temperature. Commercially available thermal absorptive layers (101) are available as well. Examples of such materials include $VO_2$, amorphous Si and metals as bolometric materials while, $LiNbO_3$ as pyroelectric material. Other materials are possible such as $Mn_{1.56}Co_{0.96}Ni_{0.48}O_4$ thin films or the general structure $La_{1-x}A_xMnO_3$ (A=Ca, Sr, Ba, Pb). A stack of layers may be deposited on the infrared sensitive layer to increase the absorption for example, (100-nm) $Si_3N_4$/(15-nm) NiCr/(100-nm) $SiO_2$ deposited on $Mn_{1.56}Co_{0.96}Ni_{0.48}O_4$ film can improve the mid IR absorption. Another emerging SWIR photosensor that can be used is based on colloidal quantum dot (CQD) thin film photodiodes fabricated monolithically on silicon readout wafers.

In order to enhance the radiation absorption additional layers maybe added such as an ultrathin absorptive layer or black gold or organic black absorptive layers. It is well known that thin absorbing layer (such as 6-nm of Cr) deposited on prism or grating can support broadband lossy modes under total internal reflection condition, thus enhancing the absorption over a wideband. This layer on prism or in conjunction with grating can be used then together with the LC layer to enhance the temperature variations in the LC layer. In order to enhance the spatial resolution which can be limited due to lateral thermal diffusion, particularly when metals are used, it is preferable to have them as pixelated layers. This is still an advantage over the standard pixelated cameras because no complicated circuitry is required for each pixel separately. The pixilation is done in order to avoid the limitation of the lateral thermal diffusion. In yet another embodiment commercially available microbolometer arrays maybe used in conjunction with the LC layer without the complicated circuitry required when the array is used as thermal imager.

Liquid crystal device integration: Once the resonant structures (such as Fabry Perot mirrors or photonic crystal, or guided mode resonant structure or gratings or other cavity types) are fabricated in either of the methods described above, the assembly and filling with the LC is straightforward and uses the state-of-the-art technology known from the LCDs industry. This includes spin coating of polymer alignment layers, polarized UV irradiation for photoalignment to obtain high contrast, baking, assembly and inspection. Many other alignment layers can be used such as oblique angle deposition, nano-patterning of the surfaces using lithography, laser scribing or self-written nano-gratings using ultrashort laser pulses.

One of the uses of the optical device disclosed in the present application is turning it into a camera for the thermal imaging, infrared range or other LW ranges, when said device is attached to mobile phone camera, for example. Absolute temperature measurements can then be done using the ROASLM (3) following a calibration process in which a black body source with known temperatures can be imaged on the device and stored as a calibration library.

Another use of the ROASLM (3) is for infrared or LW spectroscope. For that, the optical device of the present invention is equipped with a dispersive element, such as for example, gratings or prism, or Fabry-Perot etalon, which is capable of dispersing the LW radiation onto its different spectral components, each at different angle so that each spectral component hits the plane of the optically-responsive resonant structure (ORRS) (100) at different location. These locations can be in the form of lines similar to standard spectroscopes using slit as an aperture or they can be annulus when a Fabry-Perot etalon with non-collimated beam is used. Each spectral component then produces different stimulus on the liquid crystal layer which can be read with standard Si camera and visible light source. Following a calibration procedure using a known LW source, one can then deduce the spectrum passing through, reflecting or scattered from an object.

Additional use of the ROASLM (3) of the present invention is in night goggles, on which the visible image created by a parallel beam from a collimated source is focused to the eye retina using the eye lens, thus allow seeing the infrared or the LW images directly without a visible camera and a screen. The ROASLM (3) can also be used in projection display in which the visible image created on the plane of the liquid crystal is projected on a screen, thus allowing seeing the infrared, thermal or in general, the long-wave images directly on a screen.

The invention claimed is:

1. An optical device suitable for imaging of an object or scene (1), said object or scene (1) emitting a writing long-wave radiation (w), said device configured to operate in a reflection mode and comprises:
   A. A reading light unit (2) comprising:
      (a) A light source (10) configured to generate a reading light beam and to direct said reading light beam onto a collimator (20);
      (b) The collimator (20) in optical communication with said light source (10), said collimator is an optical assembly of curved mirrors or lenses designed to collimate said reading light beam, thus forming a collimated reading light beam (r), and to direct said collimated reading light beam (r) onto a resonant optically addressed spatial light modulator (ROASLM) (3);
   B. A writing light unit (4) in optical communication with the ROASLM (3) and comprising an optical assembly (50) designed to receive the writing radiation (w) from the object or scene (1) and to project said writing radiation (w) onto a photosensitive layer (101) of the ROASLM (3), thereby writing an image of the object or scene (1) on said photosensitive layer (101);
   C. The resonant optically-addressed spatial light modulator (ROASLM) (3) in optical communication with the reading light unit (2) and with the writing light unit (4), said ROASLM (3) is configured to receive the polarised collimated reading light beam (p-r) from the reading light unit (2) and the writing radiation (w) from the writing light unit (4), and to modulate said reading light beam (p-r) with said writing radiation (w), thus converting long-wave images of said object (1) into visible-range images or finding colour changes or spectral content of said writing radiation (w), said ROASLM (3) comprises:
      a) an optically-responsive resonant structure (ORRS) (100) designed to receive the writing radiation (w) from the writing light unit (4) onto the photosensitive layer (101) of said ORRS (100), thereby writing an image of the object (1) on said photosensitive layer (101), to transform light distribution created by said image into a stimulating signal suitable for modulating the reading light beam (p-r), and to direct a thereby obtained spatially intensity-modulated reading light beam (m) to a detector (40), thus creating resonance-type variations of the received spatially intensity-modulated reading light beam (m) upon the change caused by the stimulated signal;
      b) a substrate (60) comprising an inner layer of a transparent conducting electrode (TCE) for applying voltage to the ORRS (100) and an outer dielectric anti-reflection coating (ARC) layer for minimising unwanted reflections; and
      c) a voltage source (105) designed to provide a voltage waveform to the substrate (60) and to a conversion layer (104) of the ORRS (100) for optimising the voltage division between the photosensitive layer (101) and the conversion layer (104) upon receiving the writing radiation (w), thus maximising the contrast of the spatially intensity-modulated reading light beam (m);
   D. A detector (40) in optical communication with the ROASLM (3), said detector (40) is suitable for observing, detecting, reading and/or performing acquisition of the spatially intensity-modulated reading light beam (m) received from the ROASLM (3) to create visible-range images or detect colour changes or spectral content of the writing radiation (w) of the object or scene (1) emitting said writing radiation (w), and optionally to transmit said visible-range images or said spectral content of the writing radiation (w) to an external memory or user's interface; and E1. A polarising device (30) installed between and in optical communication with the reading light unit (2), the ROASLM (3) and the detector (40), said polarising device (30) is either:
  (i) a polarising beam splitter configured to receive the incident collimated reading light beam (r) from the collimator (20) of the reading light unit (2), to split said collimated reading light beam (r) into two separate, linearly polarised, collimated beams either reflected (s-r) or transmitted (p-r) with orthogonal polarisation, and to direct the polarised collimated reading light beam (p-r) to the ROASLM (3), thereby converting phase retardation changes of said collimated reading light beam (p-r) reflected from the ROASLM (3) into intensity variations expressed in the spatially intensity-modulated reading light beam (m); or
  (ii) a polariser configured to receive the incident collimated reading light beam (r) from the collimator (20) of the reading light unit (2), to generate the polarised collimated reading light beam (p-r), and to direct said polarised collimated reading light beam (p-r) to the ROASLM (3) through an analyser configured to convert the retardation or polarisation modulation of said polarised collimated reading light beam (p-r) into the spatially intensity-modulated reading light beam (m); or
  (iii) a polariser designed to receive the incident collimated reading light beam (r) from the collimator (20) of the reading light unit (2), to generate the polarised collimated reading light beam (p-r), and to direct said polarised collimated reading light beam (p-r) to the ROASLM (3);

wherein said ORRS (100) comprises:
  (a) The photosensitive layer (101) in optical communication with the substrate (60), said photosensitive layer (101) is deposited on a transparent substrate and is suitable for absorbing the writing radiation (w) in a form of the long-wave image of the object or scene (1) and transforming said image into the stimulating signal across the ORRS (100);
  (b) Optical layers (102) adjacent to the photosensitive layer (101) and suitable for inducing resonance effect to the stimulating signal formed in the ORRS (100);
  (c) Optional alignment layers (103) adjacent to the optical layers (102) and suitable for aligning liquid crystal molecules;
  (d) The conversion layer (104) adjacent to the optical layers (102) or to the alignment layers (103) and suitable for converting the resonant long-wave image of the object or scene (1) into a visible-range image;
  (e) the detector (40) is an RGB coloured camera or detectors array; and
  (f) the spatially intensity-modulated reading light beam (m) comprises three peaks or three dips in reflection spectra, said three peaks or dips being in the red, green and blue regions of said RGB coloured camera, and the colour changes are suitable for calculation in the external memory and correlation with the temperature at each point of the object or scene (1).

2. The optical device of claim 1, wherein said photosensitive layer (101) comprises at least one pixel of a bolometric layer, a microbolometric layer array, a pyrometric layer, a photovoltaic layer sensitive to the writing radiation (w), a photodiode structure, a phototransistor layer, a back-to-back photodiode structure, a liquid crystal layer absorbing in the infrared range, a terahertz (THz) absorptive layer, an infrared absorptive layer, an absorptive layer under total internal reflection conditions, in which broadband lossy modes are excited, or a black body-type layer that converts the infrared radiation into heat.

3. The optical device of claim 1, wherein said photosensitive layer (101) is pixelated, thus being suitable for minimising lateral diffusion effects of generated photocarriers or heat flux.

4. The optical device of claim 1, wherein said conversion layer (104) is an electrooptic, magnetooptic, or thermooptic layer, or a liquid crystal layer.

5. The optical device of claim 4, wherein liquid crystals of said liquid crystal layer are selected from nematic liquid crystals spatially arranged in a parallel, antiparallel, twisted, super-twisted, in-plane, hybrid or vertically aligned geometrical configuration, ferroelectric liquid crystals surface in a stabilized, vertically helical, tilted helical or deformable helix form, anti-ferroelectric liquid crystals, liquid crystal composites composed of a mixture of liquid crystals with ferromagnetic or ferroelectric nanoparticles, chiral liquid crystals, cholesteric liquid crystals, tilted or conical cholesteric liquid crystals, blue-phase liquid crystals, smectic liquid crystals, polymeric liquid crystals, liquid crystal composites with nano- and microparticles, and electroclinic liquid crystals.

6. The optical device of claim 1, wherein the ORRS (100) is selected from:
  (a) a resonant grating structure with the conversion layer (104) being a liquid crystal layer;
  (b) a guided-mode resonant grating structure with the conversion layer (104) being a liquid crystal layer;
  (c) a guided-mode resonant structure with the conversion layer (104) being a helical liquid crystal with the helix axis laying in the plane of the substrates (60);
  (d) a guided-mode resonant structure with the conversion layer (104) being a helical liquid crystal with the helix axis titled from the plane of the substrates (60);
  (e) a multi-layered structure made of porous silicon layers;
  (f) a porous structure infiltrated with the conversion layer (104), wherein said conversion layer (104) is a liquid crystal layer;
  (g) a photonic crystal structure integrated with the conversion layer (104), wherein said conversion layer (104) is a liquid crystal layer;
  (h) a periodic liquid crystal structure configured to exhibit selective reflection peaks;
  (i) a multi-layered structure, further comprising at least one of the layers selected from an absorptive layer, a coupling layer and a waveguide layer configured to excite a broadband lossy mode or a Fano resonance;
  (j) a cavity structure, such as a Fabry-Perot etalon, filled with the conversion layer (104), wherein said conversion layer (104) is a liquid crystal layer exhibiting at least one dip in reflection in the visible range; and
  (k) a plasmonic structure exhibiting at least one dip in reflection.

7. The optical device of claim 1, wherein the light source (10) is selected from a laser, a light-emitting diode (LED) or a laser diode, a wide-spectrum halogen lamp, an arc-lamp, and a mercury-vapour lamp.

8. The optical device of claim 1, wherein the detector (40) is an assembly of lenses and image sensors, or an eye of a human, or said detector (40) is selected from a charge-coupled device (CCD) imager, an electron-multiplying charge-coupled device (EMCCD) imager, an avalanche photodiode (APD), a complementary metal-oxide-semiconductor (CMOS), and a scientific-complementary metal-oxide-semiconductor (sCMOS) imager, or said detector (40) is selected from a monochrome detector designed to read intensity changes in the optical spectrum of the spatially intensity-modulated reading light beam (m), a colour detector designed to read colour changes of the spatially intensity-modulated reading light beam (m), a spectral camera designed to read wavelength shifts of the spatially intensity-modulated reading light beam (m), a spectrometer, a colour mask and a tunable filter.

9. The optical device of claim 8, wherein said CMOS imager is a CMOS imager of a smartphone camera, a stand-alone camera, or a camera of any mobile device or gadget, and said detector (40) optionally having a focusing apparatus and a computer link.

10. The optical device of claim 1, wherein the detector (40) is designed to generate raw data from a spectral content of the long-wave writing radiation emitted by the object or scene (1) as a video or as a series of static images, to process said raw data to provide information on the object or scene (1) and to output said information to an external memory or user's interface.

11. The optical device of claim 10, wherein said external memory is a mobile device, wearable gadget, smartphone, smartwatch, desktop computer, server, remote storage, internet storage, or internet cloud.

12. The optical device of claim 1, further comprising optical imaging components suitable for operating in the wavelength range of the writing radiation (w) and configured to image the object or scene (1) on the photosensitive layer (101), and optical imaging components suitable for reading the image spectral range and for imaging the plane of the ORRS (100) on the detector (40), said detector (40) is configured to operate either in the same wavelength range of the writing radiation (w), or in the visible range to image the plane of the ORRS (100) on a screen or on the eye retina.

13. The optical device of claim 1, further comprising a phase mask installed in optical communication with and in front of the detector (40) and suitable for changing the phase of the spatially phase- or phase retardation-modulated reading light beam (m), converting said changes into intensity changes on the detector (40) and calculating the phase or phase retardation of the modulated beam from at least three neighbouring pixels of said phase mask, thereby creating an image of the object or scene (1) on the detector (40) with higher dynamic range.

14. The optical device of claim 1, further comprising a wavefront sensor installed in optical communication with and in front of the detector (40) and suitable for converting the spatially phase- or phase retardation-modulated reading light beam (m) into an image of the object or scene (1) on the detector (40), based on measuring the phase or phase retardation, thus improving the dynamic range of the object or scene (1).

15. The optical device of claim 1, wherein said writing radiation (w) is in the SWIR, MIR, IR, LWIR, FIR, THz or in general the LW range of the electromagnetic spectrum, and the spatially modulated reading light beam (m) is in the visible range.

16. The optical device of claim 1, wherein the spatially intensity-modulated reading light beam (m) comprises at least one peak or one dip in reflection spectra, said spectra is suitable for correlation with temperature or emission intensity at each point of the object or scene (1).

17. The optical device of claim 1, wherein the voltage waveform and amplitude are adjustable to tune the spatially modulated reading light beam (m) to be in a desired spectral range with an optimum sensitivity.

18. The optical device of claim 1, wherein the external memory is configured to store two databases of the images received from the detector (40):
(i) a reading light transfer function of the ROASLM (3) stored as a first database for correlating the reading light (r) with the intensity and temperature information obtained from the spatially modulated reading light beam (m), for temperature mapping and pattern recognition applications; and
(ii) a reading light transfer function of the ROASLM (3) stored as a second database for correlating the reading light (r) with the voltage waveform variations in each pixel in a voltage waveform scanning mode.

19. The optical device of claim 1, wherein said device is designed to be attached to a smartphone and suitable for use as a camera of a smartphone for thermal imaging, infrared range, or other long-wave range imaging, or said device is suitable for use as an infrared or long-wave spectroscope, or said device is suitable for use in night goggles or in projection displays.

20. The optical device of claim 19, wherein said device is equipped with a dispersive element configured to disperse the long-wave radiation onto its different spectral components, each at different angle so that each spectral component hits the plane of the optically-responsive resonant structure (ORRS) (100) at different location, thereby resulting in the reading light being capable of correlating the location and intensity of each spectral component with the spectral content of the long wave writing radiation.

21. The optical device of claim 20, wherein said dispersive element is a grating, a Fabry-Perot etalon, or a prism.

* * * * *